Feb. 17, 1959     C. W. SLOCUM     2,874,344
HERMETIC MOTOR STARTING AND
OVERLOAD PROTECTION SYSTEM
Filed Dec. 12, 1957
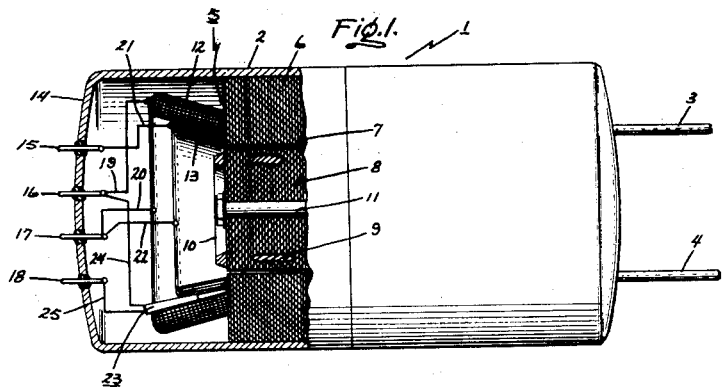
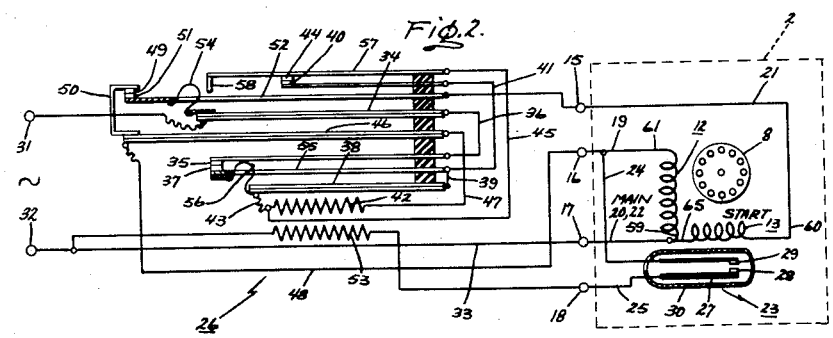
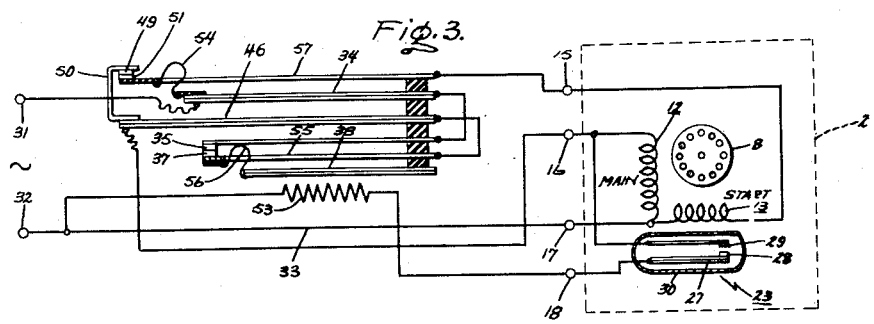
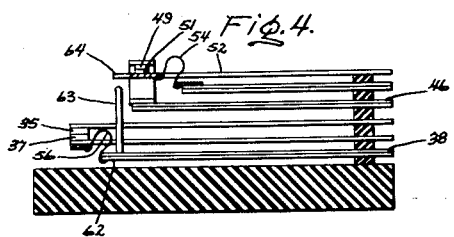
Inventor:
Charles W. Slocum,
by Just & Diah
Attorneys.

United States Patent Office 2,874,344
Patented Feb. 17, 1959

2,874,344

HERMETIC MOTOR STARTING AND OVERLOAD PROTECTION SYSTEM

Charles W. Slocum, Angola, Ind., assignor to Stubnitz-Greene Spring Corporation, Adrian, Mich., a corporation of Michigan Application December 12, 1957, Serial No. 702,364

9 Claims. (Cl. 318—221)

This invention relates to hermetically sealed single phase alternating current induction motors and more particularly to a thermally controlled system for providing starting and overload protection for such motors.

Hermetically sealed refrigeration systems are now in universal use, particularly in domestic refrigerators and air conditioners; in such systems the motor and compressor driven thereby are disposed within a hermetically sealed enclosure which communicates with the other components of the refrigeration system, e. g., evaporator, condenser, etc., and thus both the refrigerant and lubricating oils are present in the motor enclosure. In instances where a three-phase alternating current induction motor is employed for driving the compressor, no particular problems are involved in starting the motor since the winding leads are merely brought out through a wall of the motor enclosure. However, problems are presented when a single phase induction motor is utilized for driving the compressor in a hermetic refrigeration system. It is well known that a rotating field must be provided for starting an induction motor. However, once the motor has been brought up to a speed approaching the operating speed, the motor will thereafter run on a single-phase field. When an induction motor must be operated from a source of single-phase alternating current, this rotating field is conventionally provided by providing the motor stator with two sets of windings electrically and physically displaced so that the current flowing in one of the windings, and thus the resulting magnetic flux provided thereby, is phase-displaced from the current flowing in the other winding, and thus the magnetic flux provided by that winding. With such an arrangement, a two-phase rotating magnetic field is provided which will cause the motor to start and it is conventional practice thereafter to disconnect one of the two windings, generally referred to as the starting winding, so that the motor runs under the influence of the magnetic flux provided by the other winding alone, generally referred to as the main or running winding. In conventional single-phase alternating current induction motors, disconnection of the starting winding after the motor has come up to speed, is frequently accomplished by use of a centrifugal mechanism mounted on the motor shaft which actuates a switch to open the circuit of the starting winding responsive to the motor reaching a predetermined speed. In the case of hermetic refrigeration systems, however, the presence of open switch contacts within the motor enclosure cannot be tolerated and thus it has been necessary to provide means exterior to the motor enclosure for disconnecting the starting winding when the motor has come up to speed. Various voltage and current responsive devices have been provided for this purpose, such devices being well known in the art.

In addition to the requirement of providing external means for disconnecting the starting winding of a hermetically sealed single-phase alternating current induction motor, it has also been found desirable to provide overload protection for the motor which will disconnect the motor from the line in the event of an overload condition; it is general practice in domestic refrigeration and air condition to provide a motor having sufficient capacity only for maintaining the desired temperature and thus insufficient capacity for providing initial cooling or "pull-down" so that the motor is overloaded during such pull-down, the overload protection thus cycling the motor on and off until the desired temperature is obtained. In the past, such overload protection has conventionally been provided by means arranged to sense the current drawn by the motor and to disconnect the motor from the line in response to excessive motor current, as for example under a locked rotor condition. Since the conventional starting and overload devices are generally mounted on the exterior wall of the motor enclosure, the current sensing means in the overload protective portion of the device has commonly included temperature responsive means, such as a bimetallic element, such element being influenced by the external temperature of the motor enclosure and thus to some extent by the internal temperature of the motor. Thermally controlled devices have also been provided for effecting disconnection of the starting winding and my Patents 2,781,484 and 2,781,485, both issued February 12, 1957, and assigned to the assignee of the present application, both disclose thermally controlled switch mechanisms for providing both starting and overload protection for single-phase alternating current motors; such mechanisms thus have particular utility in connection with hermetically sealed motors.

While the above described systems for providing starting and overload protection for hermetically sealed single-phase alternating current induction motors have been generally satisfactory, there are circumstances in which the overload protection provided by sensing the motor current and external enclosure temperature is neither sufficiently fast-acting nor sufficient accurate to prevent damage to the motor windings; while the prior overload protection arrangements known to the applicant have been generally satisfactory for locked rotor conditions, other overload conditions may occur which will result in excessive temperature rise in the windings which will not be sensed by the external overload protection arrangement and thereby prevent damage to the windings. It is therefore desirable to provide a hermetic motor starting and overload protection system in which the actual winding temperature within the motor is sensed and the motor disconnected from the line in response to a predetermined winding temperature. While the winding temperature sensing means must be located in close heat-transfer relationship to the windings and thus on the interior of the motor enclosure, it is desirable that such interior winding temperature sensing means act upon an external device for effecting disconnection of the motor from the line. Furthermore, since as indicated above, the presence of open contacts within the motor enclosure cannot be tolerated, the winding temperature sensing means must itself be hermetically sealed. It is also desirable that a single unitary starting and overload protection device be provided which will not only perform the function of prior external starting and overload protection devices, but which will also respond to the internal winding temperature as sensed by the internal winding temperature sensing means.

It is therefore an object of this invention to provide an improved starting and overload protection system for a hermetically sealed single-phase alternating current induction motor.

Another object of this invention is to provide an improved starting and overload protection system for a hermetically sealed single-phase alternating current induction motor in which the temperature of the windings within the motor enclosure is sensed and the overload protection portion of the system responds thereto.

A further object of this invention is to provide an improved starting and overload protection system for a hermetically sealed single-phase alternating current induction motor incorporating a single unitary external device for performing not only the starting function, but also providing overload protection responsive to the temperature of the motor windings within the motor enclosure.

Further objects and advantages of this invention will become apparent by reference to the following description and the accompanying drawings, and the features of novelty which characterize this invention will be pointed out with particularity in the claims annexed to and made a part of this specification.

In accordance with my invention, I provide a single-phase alternating current induction motor arranged within a hermetically sealed enclosure and having conventional main and starting windings. A first switch assembly is provided arranged within the motor enclosure and in close heat-transfer relationship with the motor windings and comprising separable contacts and a bimetallic member for actuating the contacts responsive to a predetermined winding temperature, the contacts and the bimetallic member being disposed within a hermetically sealed envelope. Electric leads are provided for the main and starting windings and the internal switch assembly, respectively extending out of the motor enclosure, and a second switch assembly is provided disposed on the exterior of the motor enclosure for providing starting and overload protection for the motor. The second switch assembly includes a pair of line terminals adapted to be connected across an external source of single-phase alternating current with means including a second pair of contacts connecting the main winding leads across the line terminals. Means including a third pair of contacts are also provided connecting the starting winding leads across the main winding leads. Means including a second bimetallic member is arranged to open the third pair of contacts responsive to a predetermined current flow in both the main and starting windings thereby to disconnect the starting winding after the motor has come up to a predetermined speed, and means are provided connecting the internal switch assembly leads in circuit with the line terminals and including a third bimetallic member arranged to open the second pair of contacts responsive to closing of the contacts of the internal switch assembly, thereby to open the circuit of both the main and starting windings of the motor responsive to an excessive winding temperature sensed by the internal switch assembly.

In the drawings,

Fig. 1 is a side elevational view, partly in cross-section, illustrating a motor and compressor assembly for a hermetic refrigeration system, the motor including the winding temperature sensing means of my invention;

Fig. 2 is a schematic illustration showing one embodiment of my invention;

Fig. 3 is another schematic view showing another embodiment of my invention; and Fig. 4 is a view of a modified external switch assembly usable with either of the embodiments of Figs. 2 and 3.

Referring now to Fig. 1, there is shown a motor and compressor assembly, generally identified as 1, for a hermetic refrigeration system. The motor-compressor assembly 1 comprises a hermetically sealed enclosure 2 having refrigerant-conducting inlet and outlet lines 3 and 4 respectively communicating with the interior thereof and adapted respectively to be connected to the remaining elements of the refrigeration system (not shown), such as the condensor, evaporator, etc. A single-phase alternating current induction motor 5 is disposed within the enclosure 2 and comprises a conventional stator member 6, formed of a stacked plurality of relatively thin laminations of magnetic material having a central bore 7 within which a squirrel cage rotor 8 is rotatably positioned; squirrel cage rotor 8 is likewise formed of a stacked plurality of relatively thin laminations of magnetic material having a short-circuited squirrel cage winding formed of conductors 9 disposed therein, the external ends of the squirrel cage conductors 9 being connected together by short circuiting end rings 10. Rotor 8 is mounted on shaft 11 which is connected to drive the compressor (not shown). The stator member 6 of the motor 5 is provided with conventional main or running windings 12 and starting windings 13, it being understood that the motor construction thus far described is conventional and here shown for illustrative purposes only.

The end wall 14 of the closure 2 is provided with four terminals 15, 16, 17 and 18 extending therethrough and suitably insulated therefrom, as is well known in the art. The main windings 12 are connected across external motor terminals 16 and 17 by suitable internal electrical leads 19 and 20 and the starting windings 13 are likewise connected across external motor terminals 15 and 17 by suitable internal electrical leads 21 and 22. In order to provide for sensing of the temperature of motor windings 12 and 13 in accordance with this invention, I provide a hermetically sealed internal switch assembly 23, shown here as being positioned between main winding 12 and starting winding 13 respectively in contact with the windings and thus in close heat-transfer relationship therewith; internal switch assembly 23 has its leads 24 and 25 respectively connected across external motor terminals 16 and 18 as shown. It will be understood that the internal temperature sensing switch assembly 23 may be arranged in contact with either the exterior surface of the end turns of main winding 12 or the interior surface of the end turns of starting windings 13, or may even be disposed in one of the slots in stator member 6 in which the windings 12 and 13 are arranged.

Referring now to Fig. 2 in which like elements are indicated by like reference numerals, I have shown an external thermally controlled switch assembly, generally identified as 26, similar to that shown in my above referred to Patent 2,781,845, but additionally incorporating means responsive to the internal temperature sensing switch 23. Here, the internal winding temperature sensing switch 23 includes an elongated bimetal member 27 having a contact 28 mounted thereon cooperating with stationary contact 29, the contacts 28 and 29 being normally open and being closed responsive to distortion or deflection of the bimetallic member 27, in turn responsive to a predetermined temperature of the windings 12 and 13 sensed thereby. Bimetallic member 27 and the separable contacts 28 and 29 are all enclosed within a hermetically sealed envelope 30 having the leads 24 and 25 extending therefrom.

External thermally controlled switch assembly 26 includes a pair of line terminals 31 and 32 adapted respectively to be connected to an external source (not shown) of single-phase alternating current power, such as 120 volts, 60 cycles. The line terminal 32 is directly connected to external motor terminal 17 by a conductor 33 and the other line terminal 31 is connected to one end of elongated bimetallic member 34. The other end of the bimetallic member 34 is connected to contact 35 by a connection 36, the contact 35 cooperating with contact 37 which in turn is connected to one end of bimetal member 38 by connection 39 and also to contact 40 by a connection 41. The other end of the bimetallic member 38 is connected to a non-inductive heating element 42 by connection 43 and also to contact 44 cooperating with contact 40 by a connection 45. The other end of the heating element 42 is connected to one end of bimetallic member 46 by a connection 47 with the other end of the bimetallic member 46 being connected to external motor terminal 16 by a connection 48. The other end of the bimetallic member 46 is likewise connected to a contact 49 by a link 50, contact 49 cooperating with contact 51 on switch arm 52 which in turn is connected to external motor terminal 15. External motor terminal 18 is connected to one end of non-inductive heating element 53 disposed to influence bimetallic member 38 and having its other end connected to conductor 33 and thus to line terminal 32 as shown. Bimetallic member 34 is arranged to actuate switch arm 52 by a toggle spring 54; as shown in Fig. 2, bimetallic member 34 is shown in its cool position so that toggle spring 54 is in its first or stable position biasing switch arm 52 upwardly to close contacts 49 and 51. When the bimetallic member 34 is heated sufficiently due to a flow of a predetermined current therethrough, it is distorted or flexed upwardly thereby causing toggle spring 54 to move switch arm 52 downwardly thereby opening the separable contacts 49 and 51; the toggle spring is provided in order to provide a differential between the temperature at which contacts 49 and 51 are opened and the temperature at which the contacts are closed.

Bimetallic member 38 is likewise connected to switch arm 55 on which contact 37 is mounted, by means of another toggle spring 56; here again bimetallic member 38 is shown in its normal or unheated condition with toggle spring 56 in its stable position urging switch arm 55 upwardly thereby to close contacts 35 and 37. When the bimetallic member 38 is heated due to current flow therethrough and also due to heating from heating elements 42 and/or 53, it likewise is deflected or flexed upwardly thereby causing toggle spring 56 to move switch arm 55 downwardly to open separable contacts 35 and 37; toggle spring 56 is again provided in order to insure a differential between the temperature at which contacts 35 and 37 are opened and the temperature at which they are closed. Contact 44 is mounted on switch arm 57 which has a projection 58 formed at its end. Bimetallic member 34 is arranged so that at a first predetermined current flow therethrough, it will be deflected or flexed upwardly sufficiently to open contacts 49 and 51, however it is not at this predetermined current flow deflected or flexed upwardly a sufficient amount to engage projection 58 on switch arm 57. However, in response to a greater predetermined current flow through bimetallic member 34, the member will be deflected or flexed upwardly a greater amount thereby engaging projection 58 and biasing switch arm 57 upwardly thereby to open contacts 40 and 44.

In tracing out the circuit of the switch assembly 26 described above, it will be seen, starting with the line terminal 31, that there is provided in series between the line terminal 31 and the motor external terminal, 16, the bimetallic member 34, the separable contacts 35 and 37, the bimetallic member 38, the heating element 42, the bimetallic member 46, and conductor 48. It is also seen that there is connected between the external motor terminals 15 and 16, the switch arm 52, the contacts 49 and 51, the link 50 and the conductor 48; it is thus seen that contacts 49 and 51 are essentially connected between the external motor terminals 15 and 16. It will now be seen that with one end 65 of starting winding 13 connected to end 59 of main winding 12, contacts 49 and 51 connect the other end 60 of starting winding 13 across the other end 61 of main winding 12. It will further be seen that the contacts 35 and 37 are in series with both the main winding 12 and the starting winding 13 and that the contacts 40 and 44 when in their normal closed position essentially short circuit the bimetallic member 38.

It will now be seen that when the contacts 49 and 51 are closed thus connecting the starting winding 13 across the main winding 12, contacts 40 and 44 are closed thus short circuiting the bimetallic member 38, contacts 35 and 37 are closed thus permitting the application of power to the main winding 12 and starting winding 13, and contacts 28 and 29 of the internal temperature sensing switch assembly 23 are open. The starting inrush current drawn by the main and starting windings 12 and 13 heats the bimetallic member 34 causing it to be deflected or flexed upwardly and thus to open contacts 49 and 51 thereby to disconnect the starting winding 13 from the circuit so that the motor runs on the main winding 12 alone. Assuming that no overload condition of any sort occurs, bimetallic member 34 will not be deflected or flexed upwardly a sufficient amount to open contacts 40 and 44 and thus bimetallic member 38 will remain short circuited or disabled, the normal current flow through heating element 42 alone being insufficient sufficiently to deflect or flex bimetallic member 38 to open contacts 35 and 37. However, assuming that an overload condition, such as a locked rotor condition occurs, the excessive current flow drawn by main winding 12 will cause bimetallic member 34 to deflect or flex upwardly an additional amount sufficient to engage projection 58 on switch arm 57 and thus rapidly to open contacts 40 and 44 to remove the short circuit across bimetallic member 38. The main winding current will thus now flow through the bimetallic member 38 rather than through the short circuit established by the contacts 40 and 44 and since the bimetallic member 38 is already initially heated by heating element 42, it likewise rapidly will deflect or flex a sufficient amount to open contacts 35 and 37 thereby opening the circuit of both the main winding 12 and the starting winding 13 thereby to remove energization from the motor. The opening of the contacts 35 and 37 terminates the current flow through the bimetallic members 34 and 38 and those members will thus begin to cool. Due to the inherent temperature differentials provided by toggle springs 54 and 56, bimetallic member 34 will deflect or flex downwardly at a faster rate than bimetallic member 38 thus disengaging projection 58 in switch arm 57 thereby to close contacts 40 and 44 and also to close starting contacts 49 and 51 before the main contacts 35 and 37 are closed; this insures that the starting contacts 49 and 51 are closed before the motor is again energized so that if the condition which caused the overload has been removed, the motor is immediately in condition for starting. It will be observed that the current drawn by both the main winding 12 and starting winding 13 traverses the bimetallic member 46 and that the contact 49 associated with contact 51 is supported at the free end of bimetallic member 46 by link 50. Bimetallic member 46 thus serves as an ambient temperature compensating member to vary the position of contact 49 so that contacts 49 and 51 will be respectively opened and closed responsive to the same temperature differential without regard to the ambient temperature to which the external switch assembly 26 is exposed.

Considering now the condition in which the temperature of the windings 12 and 13 becomes excessive, for example due to an abnormally high ambient temperature condition or an internal short circuit or ground, the temperature of windings 12 and 13 will be sensed by the internal temperature sensing switch asesmbly 23 and at a predetermined winding temperature bimetallic member 27 will be deflected or flexed upwardly sufficiently to close contacts 28 and 29. This then connects the heating element 53 between line terminal 32 and external motor terminal 16 which in turn is connected through the switch assembly 26 to the other line terminal 31. Heating element 53 is thus energized and is arranged to provide sufficient heat to deflect or flex the bimetallic member 38 to open the main contacts 35 and 37 thus to de-energize main winding 12 and also starting winding 13 if contacts 49 and 51 have not yet opened. It will be seen that opening of the main contacts 35 and 37 also opens the circuit of the heating element 53 so that current no longer flows through the bimetallic member 27 of the internal temperature sensing switch 23 and thus bimetallic member 27 is allowed to cool responsive to cooling of the windings 12 and 13 so that contacts 28 and 29 will open at a predetermined lower temperature.

It is thus seen that with the arrangement of Fig. 2, normal starting of the motor is provided along with normal overload protection responsive to excessive motor current, and that additional overload protection is provided responsive to internal winding temperature, the motor thus being protected against certain overload conditions not normally sensed by prior starting and overload protection devices known to the applicant, and further providing faster action even in those overload conditions which were protected by prior devices.

Referring now to Fig. 3 in which like elements are again indicated by like reference numerals, a somewhat simplified arrangement is shown which essentially incorporates the thermally controlled switch mechanism shown in my above referred to Patent 2,781,484. In this arrangement, overload protection responsive to excessive motor current is eliminated, reliance being placed on the sensing of excessive winding temperature by the internal temperature sensing switch 23 for providing the overload protection. Thus, heating element 42 associated with bimetallic member 38 and the short circuiting contacts 40 and 44 are eliminated with bimetallic member 38 not being connected in series with the windings 12 and 13 and with the heating element 53 in series with the internal temperature sensing switch 23 being the sole influence upon the bimetallic member 38. It is thus seen that bimetallic member 34, contacts 35 and 37, and temperature compensating bimetallic member 46 are serially connected between line terminal 31 and external motor terminal 16 with starting winding contacts 49 and 51 again being connected between external motor terminals 15 and 16. Thus, both contacts 49 and 51 and 35 and 37 are closed when the motor is initially connected across the line, the starting inrush current drawn by the main winding 12 and starting winding 13 causing bimetallic member 34 to deflect or flex upwardly thereby opening contacts 49 and 51 to disconnect starting winding 13 from the main winding 12 thereby permitting the motor to continue to run under the influence of the main winding 12 alone. When excessive temperature rise of the windings 12 and 13 is sensed by the internal temperature sensing switch 23 so that bimetallic member 27 causes contacts 28 and 29 to close, heating element 53 is again energized causing deflection or flexing of the bimetallic member 38 upwardly thereby to open main contacts 35 and 37 to disconnect the motor from the line.

Referring now to Fig. 4, it may be found desirable to insure positive closing of the starting winding contacts 49 and 51 before closing of the main contacts 35 and 37, and to insure such sequence of contact closing, the end 62 of bimetallic member 38 adjacent the toggle spring 56 is provided with a projection or stud 63; when bimetallic member 38 is deflected or flexed upwardly sufficiently to open the main contacts 35 and 37, projection 63 engages an extension 64 on the switch arm 52 thereby forcing the switch arm 52 upwardly against the influence of the toggle spring 54 causing contacts 49 and 51 to be closed.

While I have shown the bimetallic member 38 of Fig. 2 as being short circuited by the auxiliary contacts 40 and 44, it will be readily understood that it may be found more desirable to short circuit or disable the heating element 42 or to short circuit both the bimetallic member 38 and the heating element 42 as more fully described in my aforesaid Patent 2,781,485.

It will now be readily seen that I have provided an improved starting and overload protection system for a hermetically sealed motor in which the actual internal motor winding temperature is sensed to provide overload protection, this additional protection being provided with only one additional external terminal in the motor enclosure, and with relatively simple modification of presently available external thermally actuated starting and overload switch mechanisms.

While I have illustrated and described specific embodiments of my invention, further modifications and improvements will occur to those skilled in the art and I desire therefore in the appended claims to cover all modifications which do not depart from the spirit and scope of this invention.

What is claimed is:

1. In combination: a single-phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in close heat transfer relationship with said windings whereby said first bimetallic member senses the temperature of said windings, said first bimetallic member being arranged to close said first pair of contacts responsive to a predetermined winding temperature sensed thereby; electrical leads for said main and starting windings and said first switch assembly respectively extending out of said enclosure; and a second switch assembly disposed exteriorly of said enclosure and comprising, a pair of line terminals adapted to be connected across a source of single phase alternating current, means including a second pair of separable contacts connecting said main winding leads across said line terminals, means including a third pair of separable contacts connecting said starting winding leads across said main winding leads, means including a second bimetallic member arranged to open said third pair of contacts responsive to a predetermined current flow in both said main and starting windings thereby to disconnect said starting winding, and means connecting said first switch assembly leads in circuit with said line terminals and including a third bimetallic member arranged to open said second pair of contacts responsive to closing of said first pair of contacts thereby opening the circuit of both of said main and starting windings.

2. In combination: a single-phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in close heat transfer relationship with said windings whereby said first bimetallic member senses the temperature of said winding, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single phase alternating current, means including a second pair of separable contacts connected in series with said first and second motor terminals across said line terminals, means including a third pair of separable contacts connected between said second and third motor terminals, means including a second bimetallic member arranged to open said third pair of contacts responsive to a predetermined current flow in both said main and starting windings thereby to disconnect said starting winding, and means connecting said fourth motor terminal to the one of said line terminals to which the other end of said main winding is connected and including a third bimetallic member arranged to open said second pair of contacts responsive to closing of said first pair of contacts of said first switch assembly thereby opening the circuit of both of said main and starting windings.

3. In combination: a single-phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in close heat transfer relationship with said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single phase alternating current, one of said line terminals being connected to said first motor terminal, a second bimetallic member and a second pair of separable contacts serially connected between the other of said line terminals and said second motor terminal, a third pair of separable contacts connected between said second and third motor terminals, said second bimetallic member being arranged to open said third pair of contacts responsive to a predetermined current flow through said second bimetallic member thereby to disconnect said starting winding, and means connected between said fourth motor terminal and the line terminal to which the other end of said main winding is connected and including a third bimetallic member arranged to open said second pair of contacts responsive to closing of said first pair of contacts of said first switch assembly thereby opening the circuit of both of said main and starting winding.

4. In combination: a single phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in contact with at least one of said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single phase alternating current, one of said line terminals being connected to said first motor terminal, a second bimetallic member and a second pair of separable contacts serially connected between the other of said line terminals and said second motor terminal, a third pair of separable contacts connected between said second and third motor terminals, said second bimetallic member being arranged to open said third pair of contacts responsive to a predetermined current flow through said second bimetallic member thereby to disconnect said starting winding, a third bimetallic member arranged to open said second pair of contacts responsive to heating, and a heater element for said third bimetallic member connected between the fourth of said motor terminals and the one of said line terminals to which the other end of said main winding is connected whereby closing of said first pair of contacts of said first switch assembly energizes said heater and thereby causes opening of said second pair of contacts to disconnect both of said main and starting windings.

5. In combination: a single phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in contact with at least one of said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single-phase alternating current, one of said line terminals being connected to said first motor terminal, a second bimetallic member serially connected with a second pair of separable contacts and a third bimetallic member between the other of said line terminals and the second of said motor terminals, a third pair of separable contacts connected between the second and third of said motor terminals and arranged to be opened by said second bimetallic member responsive to a predetermined current flow therethrough thereby to disconnect said starting winding, said third bimetallic member having means for varying the position of one of said third pair of contacts thereby to provide ambient temperature compensation for said third pair of contacts, a fourth bimetallic member arranged to open said second pair of contacts responsive to heating, and a heater element for said third bimetallic member connected between the fourth of said motor terminals and the one of said line terminals to 6. In combination: a single-phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in contact with at least one of said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single phase alternating current, one of said line terminals being connected to said first motor terminal, a second bimetallic member serially connected with a second pair of separable contacts and a third bimetallic member between the other of said line terminals and the second of said motor terminals, a third pair of separable contacts connected between the second and third of said motor terminals and arranged to be opened by said second bimetallic member responsive to a predetermined current flow therethrough thereby to disconnect said starting winding, said third bimetallic member having means for varying the position of one of said third pair of contacts thereby to provide ambient temperature compensation for said third pair of contacts, a fourth bimetallic member arranged to open said second pair of contacts responsive to heating, a heater element for said fourth bimetallic element connected between the fourth of said motor terminals and the one of said line terminals to which the other end of said main winding is connected whereby closing of said first pair of contacts of said first switch assembly energizes said heater and thereby causes opening of said second pair of contacts to disconnect both of said main and starting windings, and means on said fourth bimetallic member arranged positively to close said third pair of contacts responsive to opening of said second pair of contacts.

7. In combination: a single phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in heat transfer relationship with said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single phase alternating current, means including a second pair of separable contacts connected in series with said first and second motor terminals across said line terminals, means including a third pair of separable contacts connected between said second and third motor terminals, means including a second bimetallic member arranged to open said third pair of contacts responsive to a first predetermined current flow in both said main and starting windings thereby to disconnect said starting winding, means including a third bimetallic member arranged to open said second pair of contacts responsive to a predetermined current flow in said main winding only thereby to disconnect both said main and starting windings, a fourth pair of separable contacts arranged normally to render said last named means ineffective, said second bimetallic member being arranged to open said fourth pair of contacts responsive to a second predetermined current flow higher than said first predetermined current flow, and means connecting said fourth motor terminal to the line terminal to which the other end of said main winding is connected and arranged to influence said third bimetallic member responsive to closing of said first pair of contacts of said first switch assembly thereby to open said second pair of contacts and to disconnect both of said main and starting windings.

8. In combination: a single phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in heat transfer relationship with said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising, a pair of line terminals adapted to be connected across a source of single phase alternating current, one of said line terminals being connected to said first motor terminal, a second bimetallic member serially connected with a second pair of separable contacts and a third bimetallic member and a heater element therefor between the other of said line terminals and said second motor terminal, a third pair of separable contacts connected across said second and third motor terminals, said second bimetallic member being arranged to open said third pair of contacts responsive to a first predetermined current flow through said second bimetallic member thereby to disconnect said starting winding, said third bimetallic member being arranged to open said second pair of contacts responsive to a predetermined current flow therethrough and heating from said heating element thereby to disconnect both of said main and starting windings, a fourth pair of separable contacts connected normally to disable at least one of said third bimetallic member and heater element, said second bimetallic member being arranged to open said fourth pair of contacts responsive to a second predetermined current flow in said second bimetallic member higher than said first predetermined current flow, and a second heater element arranged to influence said third bimetallic member and connected between said fourth motor terminal and the line terminal to which the other end of said main winding is connected thereby to cause said third bimetallic member to open said second pair of contacts to disconnect said main and starting windings responsive to closing of said first pair of contacts of said first switch assembly.

9. In combination: a single phase alternating current induction motor disposed in a hermetically sealed enclosure and having main and starting windings; a first switch assembly comprising a first pair of separable contacts and a first bimetallic member for actuating said first pair of contacts all disposed in a hermetically sealed envelope with electrical leads respectively connected to said first pair of contacts and extending out of said envelope, said first switch assembly being positioned within said enclosure and in contact with at least one of said windings whereby said first bimetallic member senses the temperature of said windings, said first bimetallic member being arranged to close said first pair of contacts responsive to a predetermined winding temperature sensed thereby; said enclosure having four motor terminals extending therethrough, said main winding being connected across a first and second of said terminals, said starting winding being connected across said first and a third of said terminals, said first switch assembly leads being connected across the fourth of said terminals and one side of said main winding; and a second switch assembly disposed exteriorly of said enclosure and comprising; a pair of line terminals adapted to be connected across a source of single phase alternating current, one of said line terminals being connected to said first motor terminal, a second bimetallic member serially connected with a second pair of separable contacts, a third bimetallic member and a heater element therefor and a fourth bimetallic member all between the other of said line terminals and said second motor terminals, a third pair of separable contacts connected across said second and third motor terminals, said second bimetallic member being arranged to open said third pair of contacts responsive to a first predetermined current flow through said bimetallic member thereby to disconnect said starting winding, said fourth bimetallic member being arranged to vary the position of one of said third pair of contacts thereby to provide ambient temperature compensation therefor, said third bimetallic member being arranged to open said second pair of contacts responsive to a predetermined current flow therethrough and heating from said heating element thereby to disconnect both of said main and starting windings, a fourth pair of separable contacts connected normally to disable at least one of said third bimetallic member and heater element, said second bimetallic member being arranged to open said fourth pair of contacts responsive to a second predetermined current flow in said second bimetallic member higher than said first predetermined current flow, and a second heater element arranged to influence said third bimetallic member and connected between said fourth motor terminal and the line terminal to which the other end of said main winding is connected thereby to cause said third bimetallic member to open said second pair of contacts to disconnect said main and starting windings responsive to closing of said first pair of contacts of said first switch assembly.

No references cited.

UNITED STATES PATENT OFFICE
CERTIFICATE OF CORRECTION

Patent No. 2,874,344                                            February 17, 1959

Charles W. Slocum

It is hereby certified that error appears in the printed specification of the above numbered patent requiring correction and that the said Letters Patent should read as corrected below.

Column 10, line 56, Claim 5, after the words "terminals to" insert the following:

> which the other end of said main winding is connected whereby closing of said first pair of contacts of said first switch assembly energizes said heater and thereby causes opening of said second pair of contacts to disconnect both of said main and starting windings.

(SEAL)        Signed and sealed this 9th day of June 1959.

Attest:

KARL H. AXLINE                                            ROBERT C. WATSON
Attesting Officer                                          Commissioner of Patents

UNITED STATES PATENT OFFICE
CERTIFICATE OF CORRECTION

Patent No. 2,874,344                  February 17, 1959

Charles W. Slocum

It is hereby certified that error appears in the printed specification of the above numbered patent requiring correction and that the said Letters Patent should read as corrected below.

Column 10, line 55, for "third bimetallic member" read -- fourth bimetallic member --.

Signed and sealed this 10th day of January 1961.

(SEAL)
Attest:

KARL H. AXLINE
Attesting Officer

ROBERT C. WATSON
Commissioner of Patents